April 10, 1951  F. BERTEIN  2,547,994
ELECTRONIC MICROSCOPE
Filed March 1, 1948  3 Sheets-Sheet 1

INVENTOR
FRANCOIS BERTEIN,
John B. Brady
ATTORNEY

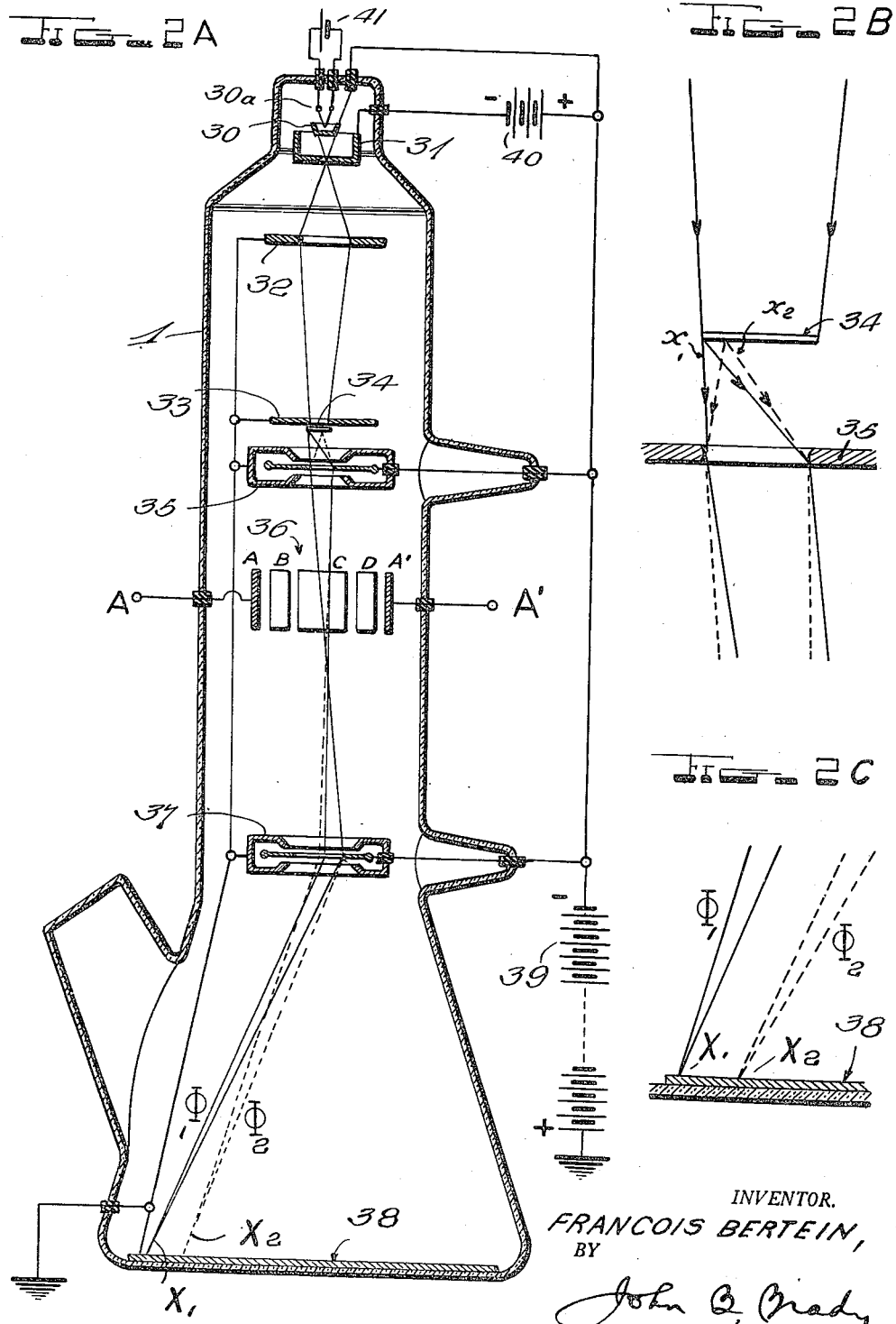

April 10, 1951  F. BERTEIN  2,547,994
ELECTRONIC MICROSCOPE
Filed March 1, 1948  3 Sheets—Sheet 3

INVENTOR
FRANCOIS BERTEIN
by John B. Brady
ATTORNEY

Patented Apr. 10, 1951

2,547,994

UNITED STATES PATENT OFFICE 2,547,994

ELECTRONIC MICROSCOPE

François Bertein, Paris, France, assignor to Compagnie Generale de Telegraphie Sans Fil, a corporation of France Application March 1, 1948, Serial No. 12,228
In France March 13, 1947

7 Claims. (Cl. 250—49.5)

The present invention relates to electronic microscopes, in which the electronic optical system has for a purpose to give to the different fractions of the beam trajectories such that the image of a point of the object under examination should be in as well defined a point as possible, this in order to increase the resolving power of the microscope and to improve the clearness of the details. The invention has for its object a new type of an electronic microscope tube, comprising complemental organs, designed for the correction of the aforesaid trajectories.

Another object of the invention is to provide a supply system, for these organs, which permits the creation of electrical fields, the intensity and distribution of which insure the desired effects.

Furthermore, in all these types of apparatus, the electronic optical system is likewise used to assure, so far as possible, the centering of the beam with relation to a predetermined axis and to thus facilitate framing.

However, different causes which are considered in detail hereinafter, constitute a limit both to the definiteness of the image and to the precision of the centering; which in practice could not be exceeded heretofore. If for example, one considers a microscope provided with an electrostatic optical system, it will be apparent that, from the fact that it cannot be attained with an absolute precision, its lenses are slightly displaced (in the transverse direction and angularly) with relation to the axis of the system (designated hereinafter by axis O-Z); the form of the lenses always departs, more or less, from the form of revolution. The electronic optical system comprises in general several openings of ovalization (ellipticity) and are de-centered slightly with relation to each other.

In the case of the optical system with magnetic focusing to the distortion cause by geometric dissymmetry, and to the defects of de-centering, there are still to be added the non-uniformity of the magnetic material employed. Another cause of distortion arises from the existence of parasitic fields in the vicinity of the instrument (such for example as the earth's magnetic field) and the superficial electrification of the insulating supports of the electrodes which does not manifest itself in a symmetrical manner. Finally, there are also the causes of periodic character, such for example as those due to the presence in the supply line of residuals of commercial frequency currents or voltages, such as furnished by 50–60 cycle power supply systems. The disturbances which these various causes introduce into the electronic trajectories are particularly troublesome in the electronic microscopes where there is required extreme precision in the images and in which they substantially reduce the resolving power. In microscopes employing electrostatic focusing, the influence of these mechanical imperfections is the more troublesome, according as the voltages applied to the lenses become very high.

If one examines the electronic optical system of a microscope with electrostatic focusing, for example, and if one designates by $r$ $Z$, $\theta$, the classical cylindrical coordinates of a point with relation to the O-Z axis of the system, O being the origin of this axis, one will observe that, in the hypothetical case of an instrument perfectly balanced, that is to say not possessing any defect of the kind of those mentioned, and not being subject to any external influence, the electric potential in the vicinity of the O-Z axis can be expressed by a formula of the type $$a_1 = a_0 + a_2 r^2 \qquad (1)$$

wherein $a_0$ and $a_2$ are functions of the coordinate $Z$ and depend upon the structural characteristics of the apparatus.

The various causes of disturbances of the electrical field as hereinbefore considered have for their effect a deformation of this field, so that its distribution takes a new form expressed in Equation 2, in which the angle $\theta$ appears $$a_2 = A_0 + A_1 r \cos(\theta - \theta_1) + r^2$$
$$[A_{0'} + A_2 \cos^2(\theta - \theta_2)] \ldots$$
$$(A_0 \ldots \theta_1 \ldots \text{function of } Z) \qquad (2)$$

The second term represents the de-centering of the divergent beams initially directed along the O-Z axis; the third term represents an effect of astigmatism.

The present invention has for its object to provide a method for permitting the correction of the trajectories of the beam in an electronic microscope, according to which one eliminates the effect on these trajectories of the imperfections of the construction, and of parasitic fields, and of variations of the supply voltage, and any other cause arising from the construction, or from without by submitting the beam to a supplementary electric field or magnetic field, of which the intensity and distribution in space are adjusted in an appropriate manner.

This eliminates the defects, by effecting a compensation by the aid of a device creating the inverse effects, the latter being superimposed on the first, as is known in the behavior of phenomena of small magnitude, and will substantially annul the aforesaid defects.

In the case of the employment of an electric field in the optical system to be corrected, it will be sufficient, according to the present invention, to create in a determined region of the beam, a supplementary potential of the type according to Equation 2, and to suitably adjust its coefficients. The limits of this adjustment depend upon the magnitude of the defects to be corrected. Thus one will introduce inverse defects and assure compensation.

I have noted that if such a correcting field exists, the law of the potential along the length of circle K centered on OZ ($r$=constant) is of the form:

Potential=$A_0 + A_1 \cos(\theta - \theta_1) + A_2 \cos 2(\theta - \theta_2)$ (3)

On the other hand, one arranges to create along the circle K a potential law of form (3); there will result therefrom automatically a potential in the neighborhood of OZ given by (2). In practice it is not necessary to exactly obtain this condition; it is sufficient that it should exist in some regions of K only.

The invention will be more readily understood by the aid of the accompanying drawings given as a non-limitative example and representing several modifications of its embodiment.

Figs. 2, 2A, 2B, 2C, 3 and 4 represent schematically a device of electrostatic correction applied to an instrument with electrostatic focusing;

Figs. 7, 8 and 9 represent a simplified modification of the device for electrostatic correction intended to annul the effect of astigmatism.

Figure 1:
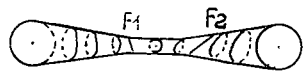
Figure 1 represents the influence of the defect called astigmatism on the cathode beam, which it is a principal object of the invention to correct.

In Figure 1 there is shown at F the single point of convergence (image) of the electronic beam in a microscope whose construction is supposed to be perfect. The effect of astigmatism introduced by the third term of Equation 2 has, for its effect, the appearance of two distinct foci $F_1$ and $F_2$ (images extended out on a line) being substituted for the single point of convergence.

Figure 2:
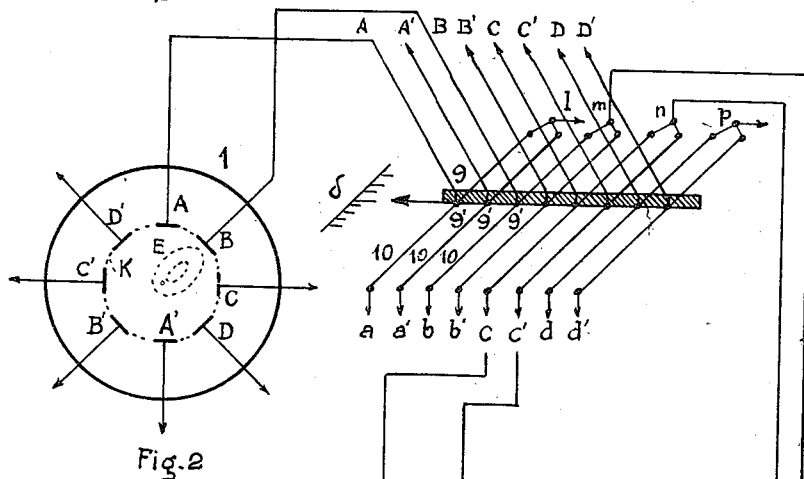

In Fig. 2 the circle 1 represents a cross section perpendicular to the O-Z axis of a microscope with an electrostatic optical system. This cross section is supposed to be located in the region after the first lens. According to the invention, there are introduced into the interior of the envelopes A, B, C, D, A', B', C', D', eight electrodes symmetrically arranged to the O-Z axis and particularly according to the circle K. This number can in practice often be reduced to six. In this example the electrodes present the form of small plates but it is often desirable to employ a spherical form of electrode. These electrodes will be fixed by means of a mounting of insulating material (not shown) placed on the interior of the tube. Separate inputs of voltages supply the electrodes. Considering an electrode of given angular position $\theta$, arrangements are made to carry it at a fixed potential defined by the relation set forth in Equation 3; thus one operates all the electrodes in such a manner that this relation is maintained on a discontinuous set of points of the circle K. Theory shows that such an arrangement is sufficient to make the potential in the neighborhood of the axis in Fig. 2 and by the aid of the adjustment of the voltages of the electrodes one can give to the coefficients of the field $\psi$ the desired values assuring the compensation.

Fig. 2A schematically shows, in a longitudinal section, the complete microscope and the corrective arrangement of Fig. 2. There are successively shown in aligned arrangement within a hermetically sealed tube 1, an electron gun consisting of a cathode 30, heated by filament 30a excited from power source 41, a Wehnelt electrode or control cylinder 31, an electrode 32 concentrating and accelerating the electron beam, the diaphragm or stage 33 carrying the object 34, the objective lens 35, five electrodes 36 of the corrective arrangement of Fig. 2, the projection lens 37, the screen 38 on which the image is formed, the electric supply 39 determining the potentials of the lenses, the bias source 40 for the control cylinder and the source 41 heating the filament. $\Phi_1$ represents the building of the image $X_1$ of the object point $x_1$, symbolized by two trajectories of the elementary beam issued from $x_1$ and focussed at $X_1$. $\Phi_2$ represents the same building for a point $x_2$, near $x_1$, on the object 34.

Figs. 2B and 2C are enlargements of the electrical beams showing the course thereof at the object 34 and the control of the beam by the objective lens 35 (Fig. 2B) and the subsequent control of the trajectories through the electrodes 36 and projection lens 37 to the impingement on the screen 38. To facilitate the tracing of the optical beams the solid lines indicate the course of the light beams from the object at $x_1$ to a point of impingement $X_1$ on the screen 38. The course of the light beam from a point $x_2$ on the object 34 to the screen 38 is indicated in dotted lines. Figs. 2B and 2C are magnified many times in order to facilitate an understanding of the system of my invention.

In Fig. 2 there has been schematically shown at E the working of the equipotentials which result from this distribution in the neighborhood of the axis: they are elliptical and the adjustment of the parameters (voltages applied in the present case) will permit control of their de-centering and their eccentricity, at the same time, both in magnitude and in orientation. It is by the aid of these operations that, on the one hand the beams will be brought onto the axis, and on the other hand that the astigmatism will be annuled.

As for the variations of the opening, caused by the system, they are negligible when considered with relation to those pre-existing in the instrument. In certain cases in which the envelope of the instrument is made of glass and in which its transverse dimensions are not prohibitive, one can consider the mounting of the electrostatic correcting device on the outside of the envelope. Preferably it will be situated on a plane in which the beam is relatively large.

In order to operate this device only quite low voltages are necessary; to be more definite approximately one hundred times the beam voltage. These voltages will be produced by the aid of the apparatus of Figs. 3 and 4, permitting a suitable adjustment of the parameters of the correction field. Reference character 3 represents a source of continuous voltage supplying a potentiometer 4 on which slide two contacts 5', controlled simultaneously by the small bar 5 and which assure the adjustment $\epsilon$. Another little bar 6 controlling two contracts connected rigidly thereto provides for the Y adjustment. This potentiometer device supplies through two electrodes $P_1$ and $P_2$, a nozzle filled with a liquid of small current conductivity and which operates as a voltage divider. Two discs 7 and 8 control, respectively, eight and four electrodes $a$, $b$, $c$, $d$, $a'$, $b'$, $c'$, $d'$, on the one hand, and $l$, $m$, $n$, $p$, on the other hand. These electrodes plunge into the liquid as shown in Fig. 4. They are controlled by discs and can turn on their axes. The disc 7 controls the position $a$, the disc 8 controls the position $\beta$.

Figure 3:
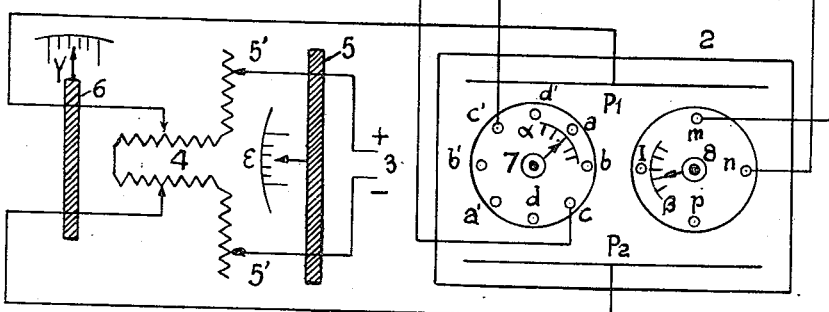
Figure 4:
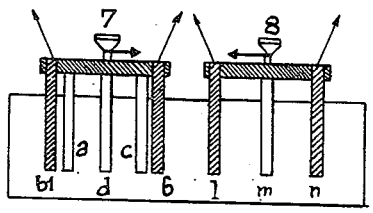

The different contact points terminating the electrodes of one of the discs will be connected to those of the other according to the arrangement shown in Fig. 3, by the aid of flexible conductors through eight potentiometers of large resistance shown schematically by segments 10. Finally, the electrodes of the compensating system A, A' of the Fig. 2 will be connected simultaneously at the points of each potentiometer carrying the same reference characters. Runners 9', 9' . . . slide along these segments, carried by the arm 9 which permits adjusting the voltage $\gamma$.

All of the adjustable elements fill the following role:

$a$ = controls the orientation of the de-centering compensator;
$\beta$ = controls the eccentricity compensator;
$\gamma$ = controls the amplitude of the assembly of these corrections;
$\delta$ = controls the percentage;
$\epsilon$ = adjusts the position of the focusing plane (action on the mean potential of the system).

The compensation operations will be controlled by the observation of the luminous spot to be improved. Such an observation, however, is very difficult sofar as concerns the correction of astigmatism. If one takes the case of microscopes, for example, the defects to be corrected cannot appear, by reason of their smallness and the insufficient luminosity of the fluorescent screen.

It will then be convenient to effect the adjustment in the following manner: Preferably there will be employed an object presenting transparent points in an opaque zone. This will give rise to homocentric beams considerably separated from each other. One will observe the trace of one of these beams on the screen for different values of the adjustment $\epsilon$ which are different from that of the focus. The trace will be of an elliptical form clearly observable. It can be made circular by adjusting $\beta$, and the astigmatism is then corrected and by the aid of $\epsilon$ one will bring it into focus on the screen. It will be understood if one is using a precision and static instrument, one will find the voltages thus determined, and one will substitute for the preceding supply, a supply defined by a single potentiometer.

The numerical example given below will better bring out the adjustment. There will be assumed an objective of a microscope of focal distance 5 mm.; let $\epsilon$ millimeters be the difference existing between the major axis and the minor axis of the oval opening. If the correcting system is constituted by six rods terminated by six spheres having a radius of 1 mm. and situated at a distance of 4 mm. from the optic axis, the following condition of compensation will be found approximately:

$$\frac{\text{Voltage applied to the system}}{\text{Beam Voltage}} = \frac{\epsilon}{2}$$

It can be shown that the limit imposed by the ellipticity of the objective on the non-corrected resolving power of the instrument is approximately:

$$\rho = \epsilon a \quad (a \text{ angle of opening})$$

One thus sees that a space of $\epsilon = 1/100$ mm. furnishes for an opening of $1/1000$, a limit of resolving power $e = 10$ m$\mu$. If the beam voltage is 40,000 volts the correction will require a voltage of the order of 200 volts.

Figure 5:
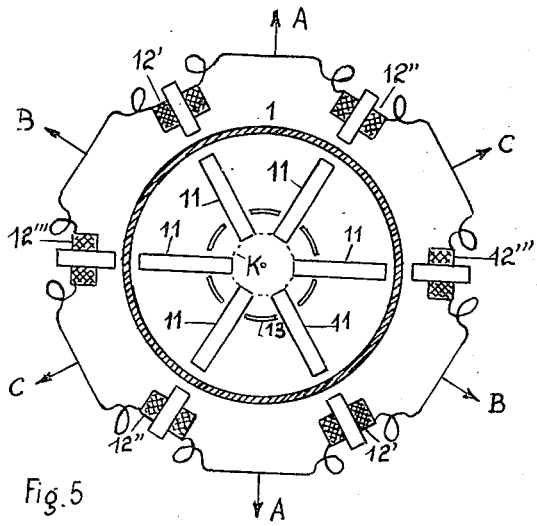
Figs. 5 and 6 represent a device for magnetic neutralization.
Figure 6:
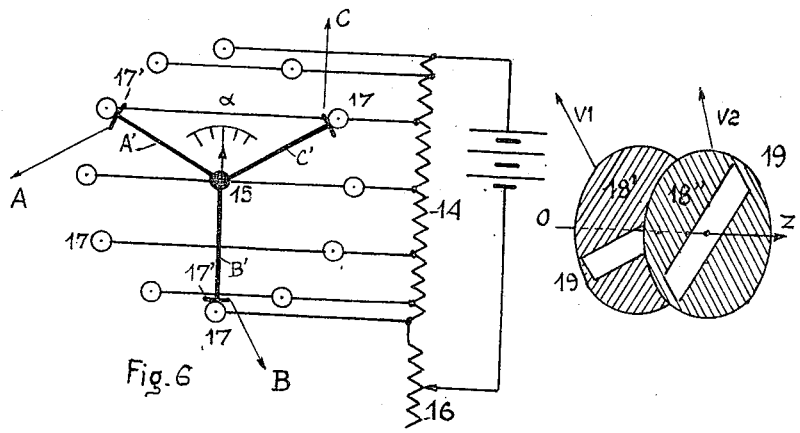

Figs. 5 and 6 relate to a modification of the invention intended to insure the compensation by making use of a magnetic correcting field. There will be disposed on the inside of the tight enclosure of the instrument, which is shown in transverse section at 1 on the drawing, perpendicular to the O–Z axis, six bars 11 of soft iron. These latter form a symmetrical assembly with relation to the O–Z axis of this optic axis. This circle is preferably chosen in a region in which the beams are relatively wide and focuses the image of the objective in a spot slightly beyond in the direction of the rays, in the vicinity of the diaphragm of the opening. Reference character 13 designates a magnetic lining pierced to permit the six bars to pass. Each bar will be energized by the aid of a winding 12 mounted on a core and traversed by a determined direct current and according to a law approximately as follows:

$$I = I_0 + I_1 \cos(\theta - \theta_1) + I_2 \cos 2(\theta - \theta_2) \quad (3')$$

($I_0$, $I_1$, $I_2$, $\theta_1$, $\theta_2$, being constants; and $\theta$ being the angular position of the bar.

This formula is analogous to that considered in connection with the modification of Fig. 1. The coils will be given the same symmetries as the bars themselves, so that the intensities of magnetization introduced into the latter, will vary when one passes from one bar to the next, according to the laws of the type of Equation 3'. From this there will result, in the vicinity of the axis, a dissymmetrical magnetic field depending upon the five parameters $I_0$, $I_1$, $I_2$, $\theta_1$, $\theta_2$. By means of the adjustment of these parameters, it can be arranged to compensate with the aid of this field, the dissymmetry introduced by the defects of the electrodes, and consequently to reestablish the stigmatism and decentering itself if that is necessary.

The electric energization of the coils will be made with the aid of a potentiometer 14 connected to a source of direct current. A number of contact points 17 arranged in a circle, are connected to this potentiometer. Three rotating arms which form a rigid assembly, controlled by the rotatable member 15, permit the application of different voltages on these contact points, by means of wiping contacts 17'. These arms are connected by flexible connections A, B and C to the respective connections on the wiring A, B, C, of the coils 12.

By spacing these arms 120° apart, it will be seen that the voltages applied will be of the form:

$$\cos \alpha \text{ to the terminals of AB}$$

$$\cos\left(\frac{2\pi}{3} + \alpha\right) \text{ to the terminals of BC}$$

$$\cos\left(\frac{4\pi}{3} + \alpha\right) \text{ to the terminals of CA}$$

It will be sufficient to make the connections according to the drawing, to excite the coils by the currents permitting the sought adjustment of the parameters of the Equation 3'.

In the embodiment shown 3', the rotation of the rotatable member 15 will cause variation of the orientation of the astigmatism compensator; that is to say, it will act on the term $I_2 \cos 2(\theta-\theta_2)$ of the Equation 3'. The variation of the amplitude of this correction is obtained with the aid of a supplementary rheostat 16 arranged in series with the source of current.

By dividing each coil 12 into three independent windings, it is possible to supply them with the aid of potentiometers, such as that of Fig. 6, in such a manner as to be able to individually adjust the three terms:

$I_0$—defining on the O–Z axis the focal plane;
$I_1 \cos (\theta-\theta_1)$ defining the amplitude and orientation of the determining corrector;
$I_2 \cos 2(\theta-\theta)$ amplitude and the orientation of the astigmatism corrector, and to thus assure all desired compensation.

The invention is not limited to the form and to the number of the correcting bars nor to their mode of energization. According to the type of instrument to be corrected and the form of its embodiment (particularly in the case in which the envelope of the tube is made of non-magnetic metal) it is possible to omit the bars and to create the correcting field, by making use of external coils only. This offers the advantage of leaving intact the walls of the evacuated envelope of the instrument. Furthermore, in certain cases it will be possible to make use of the already existing electrodes and to impress upon them the required magnetic compensation. In particular, it is possible to make use, for this purpose, of the deflecting coils in conventional sweeping tubes. The arrangement for magnetic compensation is applied to the correction not only of the electromagnetic optical systems, but likewise the electrostatic optical systems. In the latter case it offers the previously mentioned advantage of leaving intact the vacuum-tight walls of the tube. In each case there will be occasion to provide openings in the normal lining on the interior of the tubes, as shown in Fig. 5, where 13 represents the lining pierced with openings, and to exteriorly shield the correcting coils to protect them against parasitic fields.

A numerical example of the application of the magnetic correction is considered hereinafter. It is applied to the same electrostatic objective lens as the electrostatic example of correction: the focal distance 5 mm.: and the difference between the major axis and the minor axis of the oval opening being equal to $\epsilon$.

Assume that the correcting system presents approximately the following characteristics:

Diameter of the coils_____mm__ 10
Diameters of the bars_____mm__ 5
Radius of the circle K_____mm__ 15
Permeability of the metal=1000

It will be found that the number of ampere turns to be furnished on a coil for the purpose of compensating for the effect of ellipticity is of the order of:

$$NI = \frac{\epsilon}{10} \text{ (amperes, microns)}$$

It is thus seen that a spacing $$\epsilon = \frac{I}{100}$$

(limit of resolving power $e=10$ m$\mu$) will require 1 ampere-turn. The relation of limit of resolving power due to a deficient number of ampere turns, is evidently independent of the lens under consideration, whether it may be electric or magnetic.

In the examples so far considered, the purpose was to assure all optical compensations, such as the displacement of the focal plane, the displacement of the image in this place, and the correction of the astigmatism. For this purpose, there should be employed at least five correctional electrodes and one should provide for their electrical excitation a relatively complex system of supply.

The number of electrodes can be reduced if restrictions are made, correcting only a part of the defects.

Figure 7:
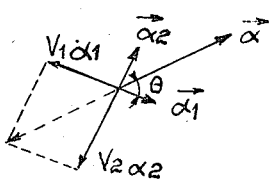
Figure 9:
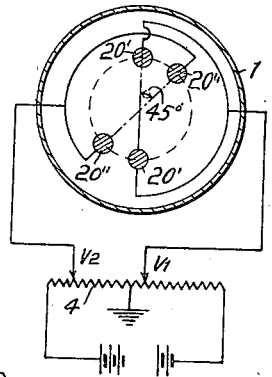

Figs. 7 and 9 represent a modification of the invention of a very simple embodiment, intended for the correction only of the astigmatism of ellipticity, using only two electrodes.

For the purpose of explaining the correction mechanism proposed, there will first be indicated several simple properties presented by astigmatism. Calculation gives as radius of the spot of least diffusion, replacing by reason of this defect, the point image of a point, an express of the form:

$$R = K|\vec{a}|$$

Besides other terms this radius R is proportional to the length of a vector $\vec{a}$, perpendicular to the axis O–Z of the system; the vector is dependent upon the distribution of the potential and geometrical defects. The vectors are assumed to be small in what follows; and, furthermore, possess additive properties, which can be expressed as follows, considering the various parts $S_1$ $S_2$ constituting the instrument S.

Let $\vec{a_1}$, $\vec{a_2}$ . . . be the vectors corresponding to the various astigmatisms due to the ellipticities of $S_1$, $S_2$ . . . assumed each time to be existing alone. The vector defining astigmatism of a total system is equal to their sum:

$$\vec{a} = \vec{a_1} + \vec{a_2} + \ldots$$

Finally, one observes that the vector relative to the single electrode assumed to be placed in a region of zero potential is proportional to the voltage applied to this electrode.

Then let $\vec{a}$ be the vector defining the astigmatism of the instrument S to be corrected.

According to the present invention, there is arranged on the O–Z axis, preferably at the place where the beam is wide (for example at the outlet of the objective), two supplementary electrodes 18'—18" of which the respective vectors are $\vec{a1}$ and $\vec{a2}$ when they are maintained at unity potential.

These electrodes will be charged at voltages $V_1$ and $V_2$, respectively.

The total astigmation of the instrument will be determined by:

$$\vec{a} + V_1\vec{a1} + V_2\vec{a2}$$

Fig. 7 gives the diagram of this vector combination. The astigmatism is corrected if this expression is zero, which is always possible for a determined value of the voltages $V_1$, $V_2$, on the condition that $\vec{a1}$ and $\vec{a2}$ should not have the same direction.

The correction formula is most simple and the convenience of adjustment is then maximum, if the vectors $\vec{a1}$ and $\vec{a2}$ are of the same length $a$ and rectangular (Fig. 7). In this case the values to be given to the voltages $V_1$ and $V_2$ are:

$$V_1 = -\frac{a}{\alpha}\cos\theta$$

$$V_2 = -\frac{a}{\alpha}\sin\theta$$

Each one of the electrodes 18′ and 18″ is provided in the form of a disc perpendicular to the O-Z axis, and pierced with a rectangular opening 19 centered on this axis. The two openings are spaced by a rotation angle of 45° around the O-Z axis. The two discs are spaced axially by a distance depending on their space requirement. Instead of the rectangular apertures there can be substituted, it will be understood, elliptical openings or any other openings, permitting the spacing, provided that the centering on the O-Z axis is retained. Finally, in the place of a disc or any other solid form there can be employed two electrodes arranged face to face, as is shown in the modification of Fig. 9, where 20′—20′ and 20″—20″ represent two pairs of electrodes whose mounting axes, perpendicular to the O-Z axis, are 45° apart and to which are applied the correction voltages $V_1$, $V_2$ which are supplied by means of an electric source 3 and a potentiometer 4.

The limit of correction to the objective, such as described with the aid of Figs. 7-9, can be likewise obtained by a magnetic field device wherein there can be employed two systems magnetized by an adjustable current, spaced 45° apart and longitudinally displaced.

In the cited examples, one would provide the adjustment by acting on the value of the voltages or currents applied to the correction devices. One can, without departing beyond the scope of the present invention, complete the correction by acting on the position of these devices, particularly by displacing them along the O-Z axis, or by inclining them more or less with relation thereto, or by rotating them, etc.

What I claim and desire to secure by Letters Patent of the United States is as follows:

1. An electronic microscope tube comprising an electron gun for projecting electron beams, an accelerating and concentrating electrode, a microscope stage, an objective, a projection lens, a microscope screen for receiving the image, and means disposed between the said objective and the said projection lens, for creating fields acting on the trajectories of said electron beams, for the purpose of improving the focalization of the said beams.

2. An electronic microscope tube comprising an electron gun for projecting electron beams, an accelerating and concentrating electrode, a microscope stage, an objective, a projection lens, a microscope screen for receiving the image, and means for creating fields acting on the electronic trajectories, for the purpose of improving the focalization of the said electron beams, disposed symmetrically about the electro-optical axis of the said tube and between the said objective and the said projection lens.

3. An electronic microscope tube comprising successively in the interior of its hermetic envelope an electron gun for projecting electron beams, an accelerating and concentrating electrode, a microscope stage, an objective, a system of corrective electrodes of electrostatic action disposed symmetrically in relation to the axis of the said tube for modifying the beam from distored section to a substantially circular section, a projection lens, and a microscope screen for receiving the image.

4. An electronic microscope tube comprising successively in the interior of its hermetic envelope an electron gun for projecting electron beams, an accelerating and concentrating electrode, a microscope stage, an objective, several corrective electrodes of electrostatic action, all having as their plane of symmetry a plane perpendicular to the electro-optical axis of the said tube and distributed symmetrically about this axis, a projection lens, and a screen for receiving the image.

5. In an electronic microscope apparatus, a tube comprising successively in the interior of its hermetic envelope an electron gun for projecting electron beams, an accelerating and concentrating electrode, a microscope stage, an objective, several magnetically permeable bars disposed symmetrically in relation to the electro-optical axis of the said microscope, and arranged in a plane of symmetry in a plane perpendicular to the said axis, a projection lens and a screen to receive the image, and externally of the said tube, a number of electromagnets equal to the number of bars, each having an axis in the prolongation of the axis of a bar, a regulable feed system of direct current, and connection means connecting the said system to the said electromagnets.

6. An electronic microscope tube comprising successively in the interior of its hermetic envelope an electron gun for projecting electron beams, an accelerating and concentrating electrode, a microscope stage, an objective, a corrective electrode of electrostatic action in the form of a disc perforated with a rectangular opening disposed in a plane perpendicular to the axis of the said tube symmetrically in relation to the said axis, a second electrode identical with the first, located in a symmetrical arrangement in relation to the said axis, its opening being displaced in relation to that of the first electrode, a projection lens, and a microscope screen for receiving the image.

7. In an electronic microscope apparatus, a tube comprising successively in the interior of its hermetic envelope an electron gun for projecting electron beams, an accelerating and concentrating electrode, a microscope stage, an objective, four corrective electrodes arranged in a plane of symmetry in a plane perpendicular to the axis of the said tube, and disposed at the same distance from the axis, and displaced in relation to each other in this plane, said electrodes being diametrically opposed in pairs, a projection lens, a microscope screen to receive the image, a direct voltage feed system, and connection means connecting the diametrically opposed corrective electrodes to one and the same direct potential.

FRANÇOIS BERTEIN.

REFERENCES CITED

The following references are of record in the file of this patent:

UNITED STATES PATENTS

| Number | Name | Date |
| --- | --- | --- |
| 1,995,376 | Campbell | Mar. 26, 1935 |
| 2,089,692 | Drewanz et al. | Aug. 10, 1937 |
| 2,103,645 | Schlesinger | Dec. 28, 1937 |
| 2,212,640 | Hogan | Aug. 27, 1940 |
| 2,259,233 | Tingley | Oct. 14, 1941 |
| 2,292,087 | Ramo | Aug. 4, 1942 |